UNITED STATES PATENT OFFICE.

ARMIN GROB AND JAKOB WÜRGLER, OF BASEL, SWITZERLAND, ASSIGNORS TO SOCIETY OF CHEMICAL INDUSTRY IN BASLE, OF BASEL, SWITZERLAND.

CONDENSATION PRODUCT OF GALLOCYANIN DYESTUFFS WITH AMINS AND PROCESS OF MAKING SAME.

1,268,455.  Specification of Letters Patent.  Patented June 4, 1918.

No Drawing.  Application filed July 7, 1917. Serial No. 179,285.

*To all whom it may concern:*

Be it known that we, ARMIN GROB and JAKOB WÜRGLER, citizens of the Swiss Republic, and residents of Basel, Switzerland, have invented new and useful Condensation Products of Gallocyanin Dyestuffs with Amins and Processes of Making Same, of which the following is a full, clear, and exact specification.

We have found that the gallocyanin-dyestuffs can be condensed with amins with a nearly quantitative output and without formation of leucogallocyanins, when a peroxy-compound, as for instance hydrogen peroxid or one of its derivatives as a peracid, a persalt, etc., is added to the reaction mass.

The process is illustrated by the following examples:

Example 1: In a mixture of 17 grams of gallocyanin hydrochlorid and 50 grams of anilin are poured, while stirring, 12 ccm. of a solution of hydrogen peroxid of 17 per cent. by volume. The reaction begins immediately, while the temperature of the mass rises to about 90° C. and carbon dioxid is developed, and is completed by heating the mixture for one to several hours on a water bath. After cooling and allowing the mass to stand for a night, the separated crystals of anilidogallocyanin are isolated by filtration and suction, washed with alcohol and dried. The yield is 16 to 17 grams of pure anilidogallocyanin.

Example 2: 17 parts of gallocyanin hydrochlorid are mixed with 60 parts of anilin and in the mixture are poured, while stirring, 12.2 parts of ammonium persulfate of 95.5 per cent. strength. The temperature of the mass rises to about 60° C. and hereafter the mass is further stirred for about 1½ hours at the temperature of a boiling water bath. After cooling of the reaction mass the separated anilidogallocyanin is isolated by filtration, washed with alcohol and dried. The yield amounts to 17-18 parts of pure anilidogallocyanin.

Example 3: 30 parts of gallocyanin hydrochlorid, 150 parts of anilin, 50 parts of anilin hydrochlorid and 45 parts of sodium perborate containing 5.5 per cent. of active oxygen are intimately mixed, whereby only a feeble rising of temperature occurs. The mass is then stirred for 2 hours at the temperature of a boiling water bath and after cooling the separated anilidogallocyanin is isolated as indicated in the foregoing example.

Example 4: In a mixture of 15 parts of gallocyanin hydrochlorid, with 50 parts of orthoanisidin are poured, while stirring, 12 parts of a solution of hydrogen peroxid of 17 per cent. strength, whereby the temperature rises to 65° C. The mass is then heated for 24 hours on a water bath, while stirring. After cooling, the condensation product is separated by filtration, washed with alcohol and dried.

Example 5: 18 grams of celestine blue (condensation product of nitrosodiethylanilin hydrochlorid with gallamic acid) and 25 grams of para-aminoacetanilid are boiled with 25 ccm. of alcohol on a water bath in a reflux apparatus and, while stirring, 15 grams of an aqueous solution of hydrogen peroxid of 17 per cent. strength are added in the course of 1 to 2 hours. The boiling is further continued for about 6 hours, while stirring. After cooling the condensation product separated is isolated by filtration, washed with alcohol and dried. It constitutes a green powder of metallic luster, is insoluble in water, difficultly soluble in alcohol with blue coloration, soluble in concentrated hydrochloric acid, concentrated sulfuric acid and concentrated formic acid to violet-red to red-violet solutions from which it is for the greater part precipitated again by much water. The new condensation product gives vivid green-blue prints and dyeings of a very good fastness to washing, when applied on textile fibers, according to the methods usually employed for the dyestuffs printed with chromium mordants. It can be reduced to a leucobody, for instance, as follows:

10 parts of the condensation product are suspended in 100 parts of cold hydrochloric acid of 36 per cent. strength and, while stirring, 5 parts of fine zinc powder are added, to the resulting suspension in the course of 1 hour. After decoloration has taken place, 100 parts of water are added and the separated leucobody is isolated by suction, washed with a solution of common salt and dried in a vacuum.

The leucobody constitutes a green-gray powder, easily soluble in dilute organic acids with a pale coloration, soluble in concentrated sulfuric acid with yellow coloration turning afterwards to red and yields vivid green-blue prints and dyeings of very good fastness to washing when applied on the textile fibers according to the methods usually employed for the dyestuffs printed with chromium mordants.

What we claim is:

1. The herein described process for the manufacture of condensation products of gallocyanin-dyestuffs with amins, consisting in reacting with the amins on the gallocyanin dyestuffs in presence of a peroxycompound.

2. The herein described process for the manufacture of condensation products of gallocyanin dyestuffs with amins, consisting in reacting with the amins on the gallocyanin dyestuffs in presence of a diluent and of a peroxycompound.

3. The herein described process for the manufacture of condensation products of gallocyanin dyestuffs with amins, consisting in reacting on the gallocyanin dyestuffs with aromatic amins, which contain in their molecule besides of the free aminogroup still an acidylamino-group, in presence of a diluent and of a peroxycompound.

4. The herein described process for the manufacture of condensation products of gallocyanin dyestuffs and an aromatic amin, consisting in reacting on the gallocyanin dyestuffs with para-aminoacetanilid in presence of a diluent and of a peroxycompound.

5. The herein described process for the manufacture of leucoderivatives of the condensation products derived from gallocyanin dyestuffs and aromatic amins, consisting in reacting on the gallocyanin dyestuffs with aromatic amins, which contain in their molecule besides the free amino-group still an acidylaminogroup, in presence of a diluent and of a peroxycompound, and treating the resulting condensation products suspended in an acid watery medium with reducing agents.

6. The herein described process for the manufacture of leucoderivatives of the condensation products derived from gallocyanin dyestuffs and an aromatic amin, consisting in reacting on the gallocyanin dyestuffs with paraamidoacetanilid in presence of a diluent and of a peroxycompound and treating the resulting condensation products suspended in an acid watery medium with reducing agents.

7. As new products, the herein described condensation products derived from gallocyanin dyestuffs and aromatic amins containing in their molecule besides the free amino-group still an acidylamino-group, which constitutes green crystals of metallic luster, insoluble in water, difficultly soluble in alcohol with a blue coloration, soluble in concentrated hydrochloric acid, in concentrated formic acid and in concentrated sulfuric acid to red-violet to violet-red solutions from which they can be reprecipitated by adding much water, and give vivid green-blue prints and dyeings of very good fastness to washing, when applied on the textile fibers according to the methods usually employed for the dyestuffs printed with chromium mordants.

8. As new products, the herein described leucoderivatives of the condensation products derived from gallocyanin dyestuffs and the aromatic amins containing in their molecules besides of the free amino-group still an acidylamino-group, which constitute green-gray powders, easily soluble in dilute organic acids with pale colorations, and soluble in concentrated sulfuric acid with yellow colorations turning afterward to red, and give vivid green-blue prints and dyeings of very good fastness to washing, when applied on the textile fibers according to the methods usually employed for the dyestuffs printed with chromium mordants.

9. As a new article of manufacture the herein described condensation product derived from para-aminoacetanilid and the gallocyanin dyestuffs resulting from the condensation of nitrosodiethyl-anilin hydrochlorid with gallamic acid, which constitutes green crystals of metallic luster, insoluble in water, difficultly soluble in alcohol with a blue coloration, soluble in concentrated hydrochloric acid, in concentrated sulfuric acid and in concentrated formic acid to red-violet to violet-red solutions, can be reprecipitated from these solutions by addition of much water and furnishes vivid green-blue prints and dyeings of a very good fastness to washing, when applied on the textile fiber according to the methods usually employed for the dyestuffs printed with chromium mordants.

10. As a new article of manufacture the herein described leucoderivative of the condensation product derived from paraaminoacetanilid and the gallocyanin dyestuffs resulting from the condensation of nitrosodiethylanilin hydrochlorid with gallamic acid, which constitutes a green-gray powder, soluble in dilute organic acids with a pale coloration and in concentrated sulfuric acid with a yellow coloration turning afterward to red, and gives vivid green-blue prints and dyeings, when applied on the textile fibers according to the methods usually employed for the dyestuffs printed with chromium mordants.

In witness whereof we have hereunto signed our names, this 31st day of May 1917, in the presence of two subscribing witnesses.

ARMIN GROB.
JAKOB WÜRGLER.

Witnesses:
 FRIDA SALADIN,
 AMAND RITTER.